US012565409B2

(12) United States Patent
Leon

(10) Patent No.: US 12,565,409 B2
(45) Date of Patent: Mar. 3, 2026

(54) CONSTRUCTION VEHICLE WITH A LATERAL CAB AND A BATTERY MODULE FASTENED BENEATH THE CAB

(71) Applicant: MANITOU BF, Ancenis (FR)

(72) Inventor: David Leon, Ancenis (FR)

(73) Assignee: MANITOU BF, Ancenis (FR)

( * ) Notice: Subject to any disclaimer, the term of this patent is extended or adjusted under 35 U.S.C. 154(b) by 274 days.

(21) Appl. No.: 18/343,133

(22) Filed: Jun. 28, 2023

(65) Prior Publication Data

US 2024/0017977 A1 Jan. 18, 2024

(30) Foreign Application Priority Data

Jul. 18, 2022 (FR) ........................................ 2207339

(51) Int. Cl.
*B66F 9/075* (2006.01)
*B66F 9/12* (2006.01)

(52) U.S. Cl.
CPC ............ *B66F 9/07531* (2013.01); *B66F 9/12* (2013.01)

(58) Field of Classification Search
CPC ............................... B66F 9/07531; B66F 9/12
See application file for complete search history.

(56) References Cited

U.S. PATENT DOCUMENTS

D376,243 S * 12/1996 Magni ............................ D34/34
6,631,775 B1 * 10/2003 Chaney ................... B60L 53/80 280/783
7,520,355 B2 * 4/2009 Chaney .................... B60K 1/04 280/783
8,978,800 B2 * 3/2015 Soma' ................... E02F 9/2025 180/68.5
9,022,399 B2 * 5/2015 Champion ............. B60G 11/64 280/124.104
10,829,351 B2 * 11/2020 Wild ....................... B60L 50/66
11,787,677 B2 * 10/2023 Rushton .............. B66F 9/07572 180/65.265
11,993,496 B2 * 5/2024 Iotti ........................ B60L 53/80
12,297,090 B2 * 5/2025 Magni ................... B66F 9/0655
(Continued)

FOREIGN PATENT DOCUMENTS

EP 2584101 4/2013
ES 3014445 T3 * 4/2025 .......... H01M 50/249
(Continued)

OTHER PUBLICATIONS

Search Report dated Mar. 8, 2023 for French Patent Application No. FR2207339.

*Primary Examiner* — Jacob B Meyer
(74) *Attorney, Agent, or Firm* — Husch Blackwell LLP

(57) ABSTRACT

The invention relates to a construction vehicle (1).
A battery module (40; 240; 340) is provided to supply electricity to at least one electric motor (80, 87) of the construction vehicle (1).
A fastening structure (70; 270) of the battery module (40; 240; 340) is designed to be removably fastened to a first longitudinal member (10-1), in a fastening position located beneath the cab (29) in the vertical direction (C-C) of the construction vehicle (1), and the battery module (40; 240; 340) in the fastening position is accessible from an outer side of the construction vehicle (1) so that said module can be brought into or out of the fastening position from the outer side of the construction vehicle (1).

16 Claims, 16 Drawing Sheets

(56) References Cited

U.S. PATENT DOCUMENTS

| | | | | |
|---|---|---|---|---|
| 2008/0006459 | A1* | 1/2008 | Niebuhr | B66F 9/0754 180/68.5 |
| 2019/0389705 | A1* | 12/2019 | Radtke | B66F 9/22 |
| 2023/0026643 | A1* | 1/2023 | Iotti | B66F 9/0754 |
| 2024/0017977 | A1* | 1/2024 | Leon | B66F 9/12 |
| 2024/0208352 | A1* | 6/2024 | Iotti | H02J 7/34 |
| 2024/0425336 | A1* | 12/2024 | Frerebeau | B66F 9/07531 |

FOREIGN PATENT DOCUMENTS

| | | | | |
|---|---|---|---|---|
| FR | 3018797 | | 9/2015 | |
| JP | 2005262978 | A | 9/2005 | |
| WO | WO-2023001621 | A1 * | 1/2023 | H01M 50/244 |
| WO | WO-2024235989 | A1 * | 11/2024 | H01M 16/006 |

* cited by examiner

CONSTRUCTION VEHICLE WITH A LATERAL CAB AND A BATTERY MODULE FASTENED BENEATH THE CAB

TECHNICAL DOMAIN

The invention relates to a construction vehicle comprising a lifting arm and a battery module for supplying electrical power to the construction vehicle.

TECHNOLOGICAL BACKGROUND

Document JP 2005-262978 A describes a construction vehicle comprising a mobile chassis that can be moved over the surface of the ground, the chassis comprising two longitudinal members parallel to each other and extending parallel to a front-rear axis of the vehicle, and a lifting arm, the lifting arm being mounted between the two longitudinal members so as to be pivotable relative to the two longitudinal members.

In document JP 2005-262978 A, the power required to operate the construction vehicle provided by an internal-combustion engine. There is however a growing demand for electrically powered construction vehicles.

However, for construction vehicles designed for lifting, considerable power is required to propel the chassis and to drive the lifting arm.

SUMMARY

Some aspects of the invention are based on the observation that, in order to ensure that the battery life of the electrically powered construction vehicle is not too short, the vehicle has to carry a significant volume of battery elements, which requires a solution for positioning the battery elements in the construction vehicle. Furthermore, the solution chosen must be easy to implement when assembling or maintaining the construction vehicle.

One idea behind the invention is to be able to position a battery module beneath a cab of the construction vehicle when the cab is located on one side of the construction vehicle.

According to one embodiment, the invention provides a construction vehicle including:

- a chassis comprising: a first longitudinal member and a second longitudinal member, the first longitudinal member and the second longitudinal member being parallel to each other and extending parallel to a longitudinal direction of the construction vehicle; and a front axle and a rear axle spaced apart in the longitudinal direction of the construction vehicle;
- a lifting arm extending parallel to the longitudinal direction of the construction vehicle, the lifting arm being articulated with the longitudinal members between the two longitudinal members so as to be pivotable relative to the longitudinal members about a pivot axis extending in a transverse direction of the construction vehicle that is perpendicular to the longitudinal direction of the construction vehicle;
- at least one electric motor for propelling the chassis and optionally for driving the lifting arm;
- a cab for an operator of the construction vehicle, the cab projecting from the first longitudinal member in the transverse direction of the construction vehicle in a direction away from the second longitudinal member, the cab being arranged between the front axle and the rear axle in the longitudinal direction of the construction vehicle; and
- a battery module for supplying electricity to the at least one electric motor, the battery module comprising a fastening structure designed to be removably fastened to the first longitudinal member, in a fastening position located beneath the cab in a vertical direction of the construction vehicle that is perpendicular to the longitudinal direction and to the transverse direction of the construction vehicle, and
- in which the battery module in the fastening position is accessible from an outer side of the construction vehicle so that said module can be brought into or out of the fastening position from the outer side of the construction vehicle, the outer side of the construction vehicle being oriented in the transverse direction of the construction vehicle.

The result is a construction vehicle that can be partially or even entirely electrically powered. The fact that the battery module is accessible from an outer side of the construction vehicle when in the fastening position, thereby enabling said module to be brought into and out of the fastening position from the outer side of the construction vehicle makes installation of the battery module relatively simple, and enables this operation to be carried out just before manufacture of the vehicle is completed. Furthermore, maintenance of the vehicle is also relatively simple since the positioning of the battery module makes said module easily accessible. Furthermore, the fact that the battery module is located beneath the cab in the vertical direction of the vehicle protects the battery elements to some extent against accidental impact, particularly from falling objects.

Unless explicitly stated otherwise, the expression “electrically connected” includes both a direct electrical connection (with no interposed electrical element) and an indirect electrical connection (with one or more interposed electrical elements).

According to the embodiments, such a construction vehicle may have one or more of the following features.

According to one embodiment, the fastening structure comprises a profiled element that is removably fastened, for example by bolting or screwing, at both ends thereof directly to the first longitudinal member.

“Directly fastened” means that the profiled element is fastened to the first longitudinal member itself and not to an intermediate part between the profiled element and the first longitudinal member.

According to one embodiment, the first longitudinal member comprises at least one stop that is located beneath the profiled element in the vertical direction of the construction vehicle and on which the profiled element rests when fastened to the first longitudinal member.

According to one embodiment, the construction vehicle further comprises two retaining plates projecting from the first longitudinal member, the two retaining plates being located beneath the cab and extending in the vertical direction and the transverse direction of the construction vehicle and being spaced apart from one another in the longitudinal direction of the construction vehicle, and the fastening structure comprises two fastening plates, each of the two fastening plates being removably fastened, for example by bolting or screwing, to one of the retaining plates.

According to one embodiment, the battery module further comprises two guide elements, each guide element being intended to cooperate with an upper end of one of said retaining plates so as to guide the battery module towards the fastening position in a translational movement parallel to the transverse direction of the construction vehicle.

According to one embodiment,

- the construction vehicle further comprises two fastening arms projecting from the first longitudinal member, the two fastening arms extending beneath the cab in the transverse direction of the construction vehicle and being spaced apart from one another in the longitudinal direction of the construction vehicle;
- the fastening structure comprises two fastening portions; and
- each of the two fastening arms has a fork, each of the fastening portions being removably fastened to one of the forks.

According to one embodiment, at least one of the forks has a sliding surface extending in the vertical direction and the longitudinal direction of the construction vehicle, and at least one or each of said fastening portions is designed to slide on the sliding surface in a translational movement parallel to the vertical direction into the fastening position.

According to one embodiment, at least one or each of said fastening portions comprises a polymer or rubber sliding element for sliding on the sliding surface.

According to one embodiment, the battery module extends in part beneath a space between the longitudinal members.

According to one embodiment, at least one of the two fastening arms supports the cab.

According to one embodiment, the construction vehicle comprises a power distribution box electrically connected to said at least one electric motor.

The electrical architecture of the battery module can be realized in various different ways.

According to one embodiment, the battery module has a single power output socket electrically connectable to the power distribution box.

According to another embodiment, the battery module has several, for example three, power output sockets electrically connectable to the power distribution box. These multiple power output sockets help to reduce electromagnetic interference and/or to increase the power delivered by the battery module.

According to one embodiment, the battery module comprises:

- a base plate, the fastening structure being rigidly connected to or supporting the base plate;
- at least two battery elements resting on an upper face of the base plate, in the vertical direction of the construction vehicle;
- at least one electrical connection box electrically connected to the battery elements, the electrical connection box comprising a power output socket electrically connectable to the power distribution box.

According to one embodiment, the battery module has separator plates separating the battery elements and to which the battery elements are fastened by means of removable fastening elements.

According to one embodiment, the removable fastening elements and the separator plates are electrically conductive, the separator plates being electrically connected to each other and to the battery elements to form a common electrical ground for the battery elements.

According to one embodiment, the power distribution box includes a charging socket for charging the battery module.

According to one embodiment, the battery module further comprises a fairing, the fairing facing outwards from the construction vehicle in the transverse direction in the fastening position of the battery module.

According to one embodiment, the fairing has one or more steps allowing the operator of the construction vehicle to access the cab.

In one embodiment, the fairing has a hatch.

In one embodiment, the hatch provides access to the aforementioned electrical connection box.

According to one embodiment, the construction vehicle further comprises a charging cable, the charging cable being electrically connectable to the charging socket, and the hatch provides access to a compartment dimensioned to contain the charging cable.

According to one embodiment, the construction vehicle also comprises additional battery elements for supplying electricity to the at least one electric motor, and said elements are for example contained in a compartment in the chassis.

According to one embodiment, the additional battery elements are electrically connected to the power distribution box, for example via one of said connection boxes.

SHORT DESCRIPTION OF THE FIGURES

The invention can be better understood, and additional objectives, details, features and advantages thereof are set out more clearly, in the detailed description below of several specific embodiments of the invention, given solely as non-limiting examples and with reference to the attached drawings.

Figure 11A:
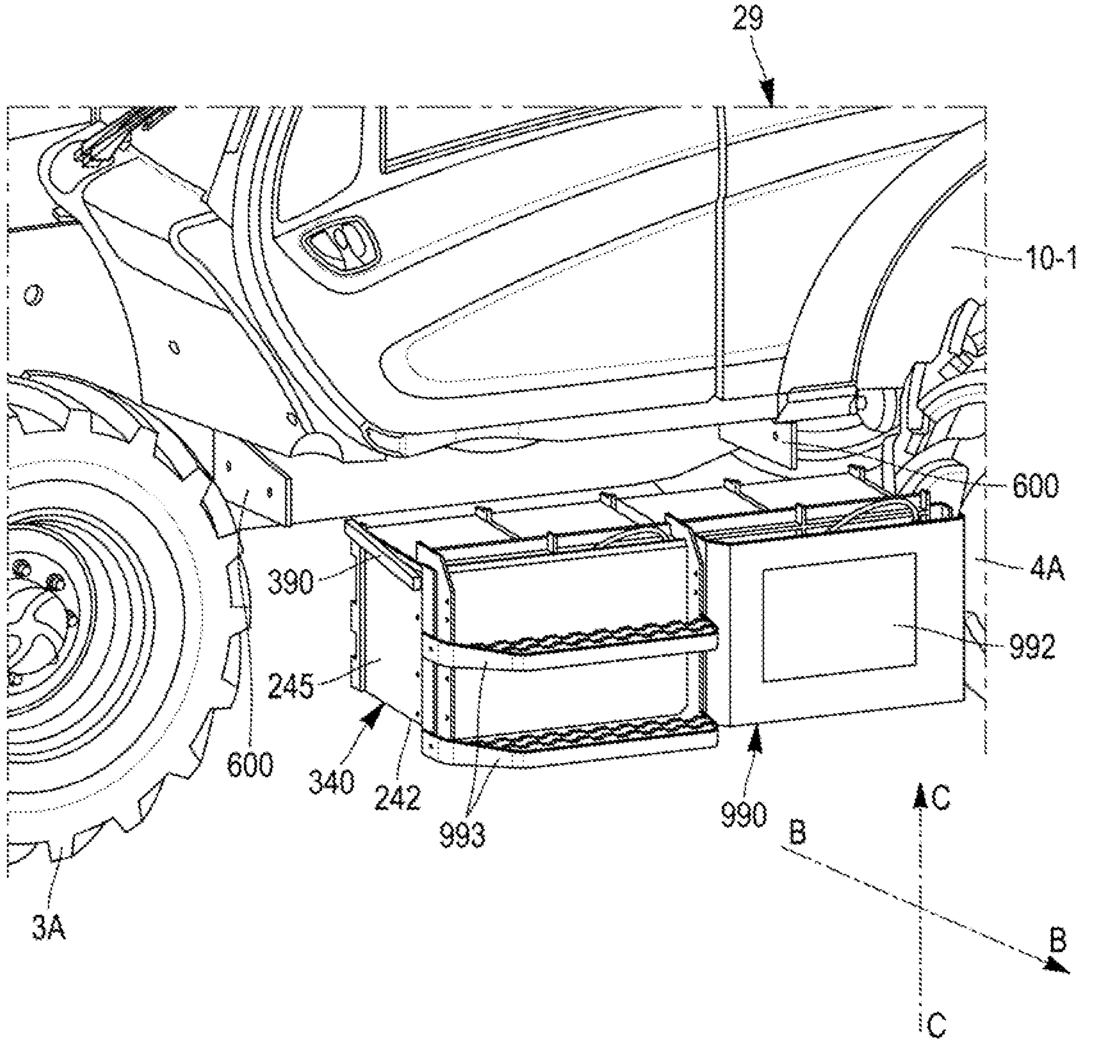
FIG. 11A is a partial perspective view showing another variant of the battery module that is intended to be fastened indirectly to a longitudinal member, in a fastening position that is located beneath the cab of the construction vehicle in a vertical direction of the construction vehicle.
Figure 11B:
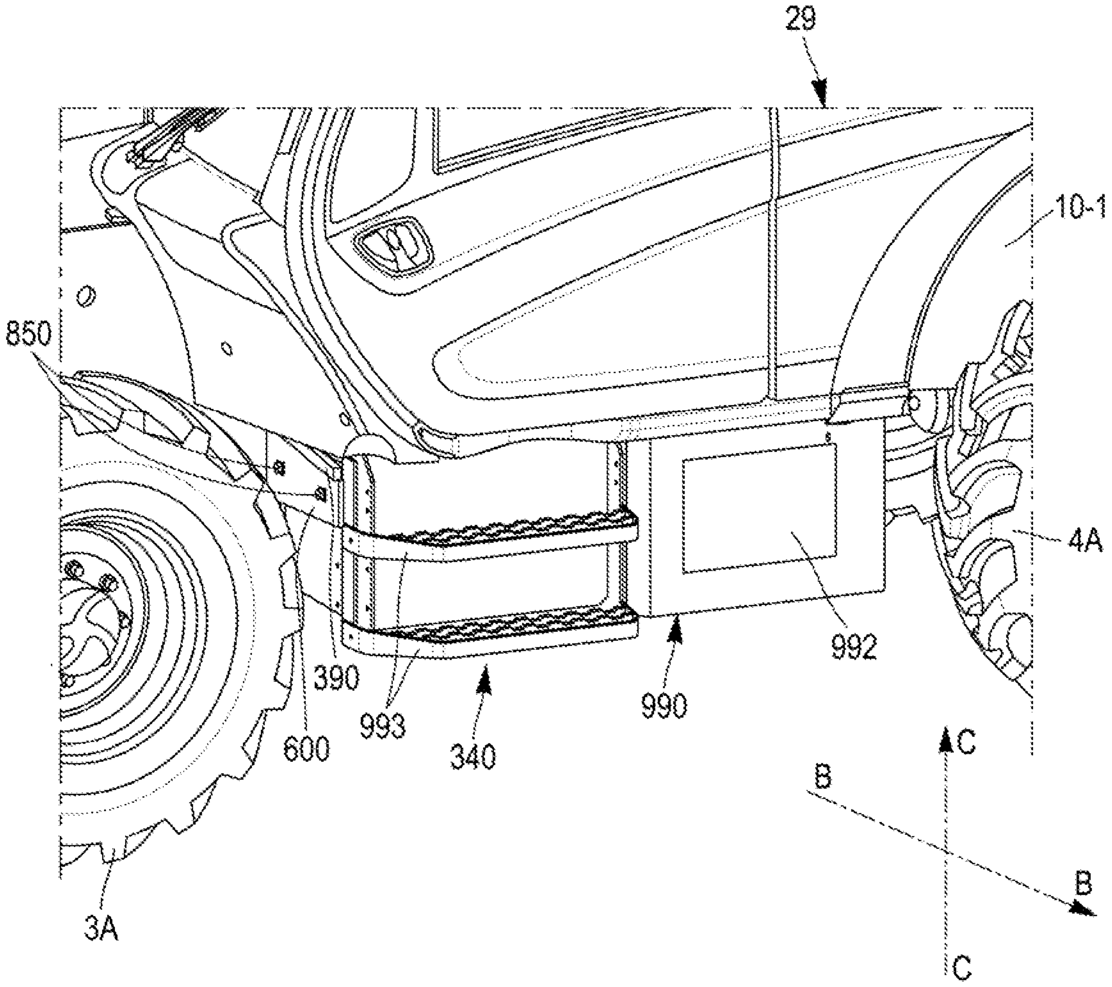
FIG. 11B is a view similar to FIG. 11A, showing the battery module fastened to the retaining plates shown in FIG. 11A.
Figure 11C:
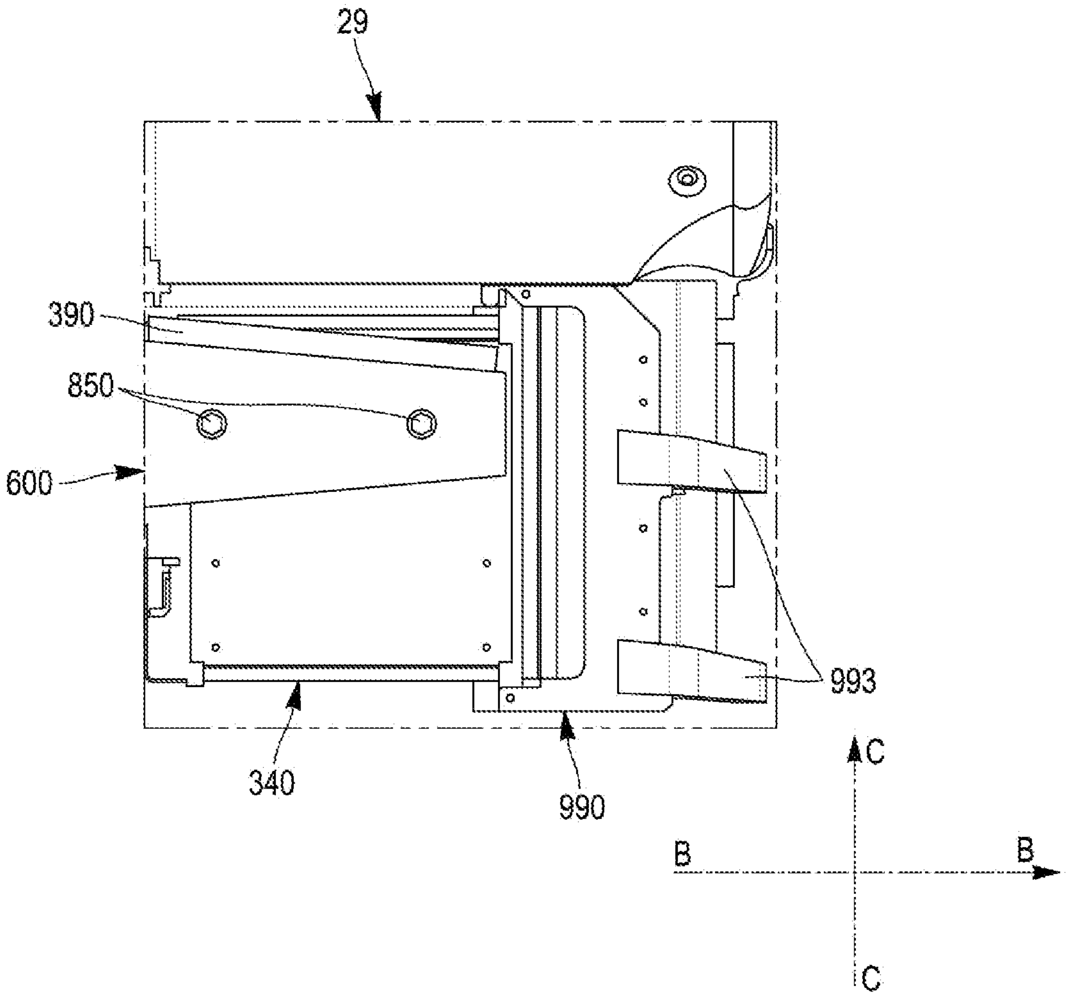

FIG. 110 FIG. 11C is a view showing the battery module fastened to the retaining plates as in FIG. 11B, from the side perpendicular to one of the retaining plates.

DESCRIPTION OF EMBODIMENTS

Figure 1:
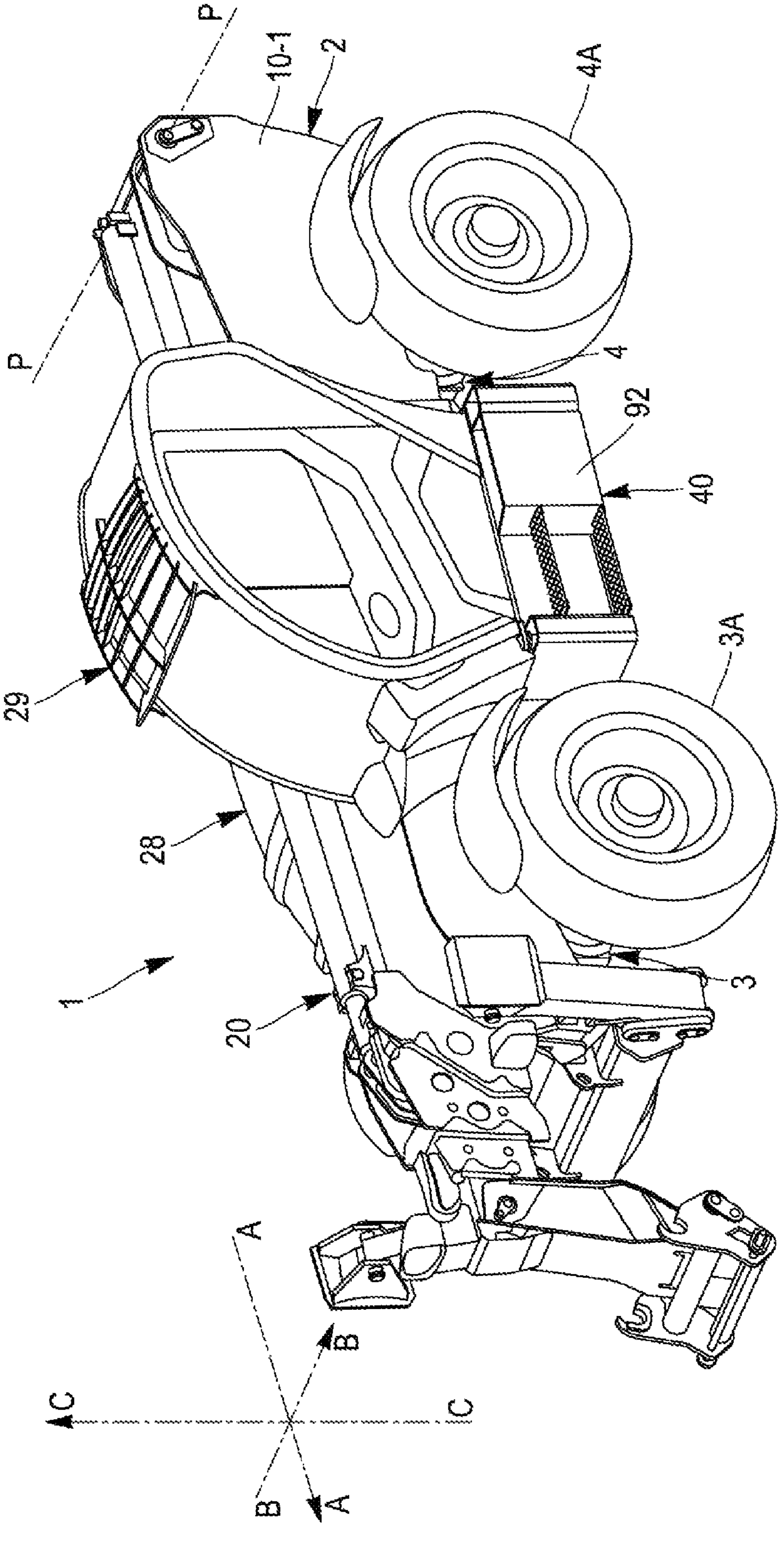
FIG. 1 is an overall perspective view of a construction vehicle.

FIG. 1 is an overall perspective view of a construction vehicle 1, hereinafter referred to as the “vehicle 1” for convenience. The vehicle 1 is a telescopic forklift truck in this case.

In the figures, the arrow A-A indicates a longitudinal direction of the vehicle 1, the arrow B-B indicates a transverse direction of the vehicle 1, and the arrow C-C indicates a vertical direction of the vehicle 1. The longitudinal direction A-A is a front/rear direction of the vehicle 1. The transverse direction B-B is a left-right direction of the vehicle 1 and is perpendicular to the longitudinal direction A-A. The vertical direction C-C is perpendicular to the longitudinal direction A-A and to the transverse direction B-B.

The vehicle 1 has a chassis 2 and a lifting arm 20.

Figure 2:
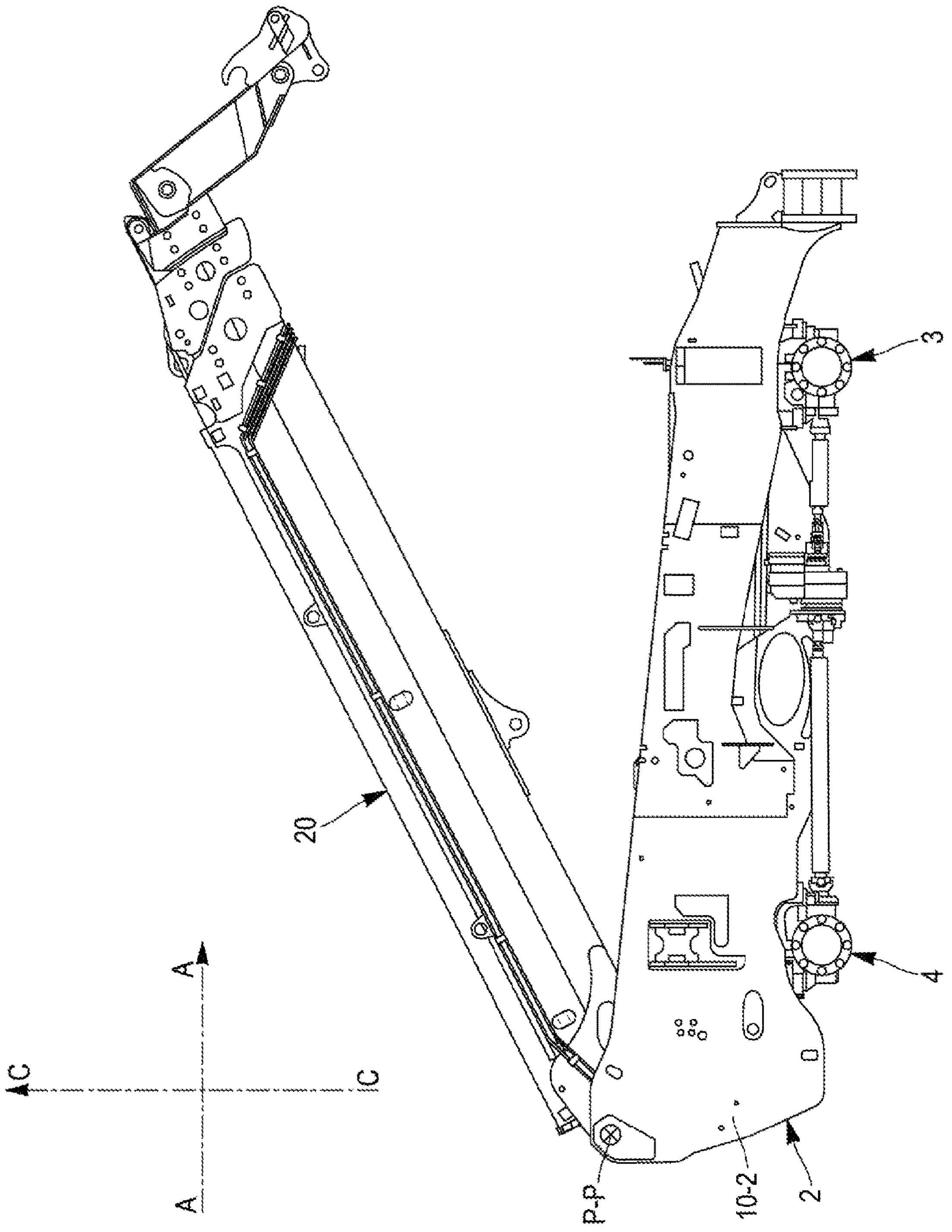
FIG. 2 is a side view of the chassis and axles of the construction vehicle shown in FIG. 1.
Figure 3:
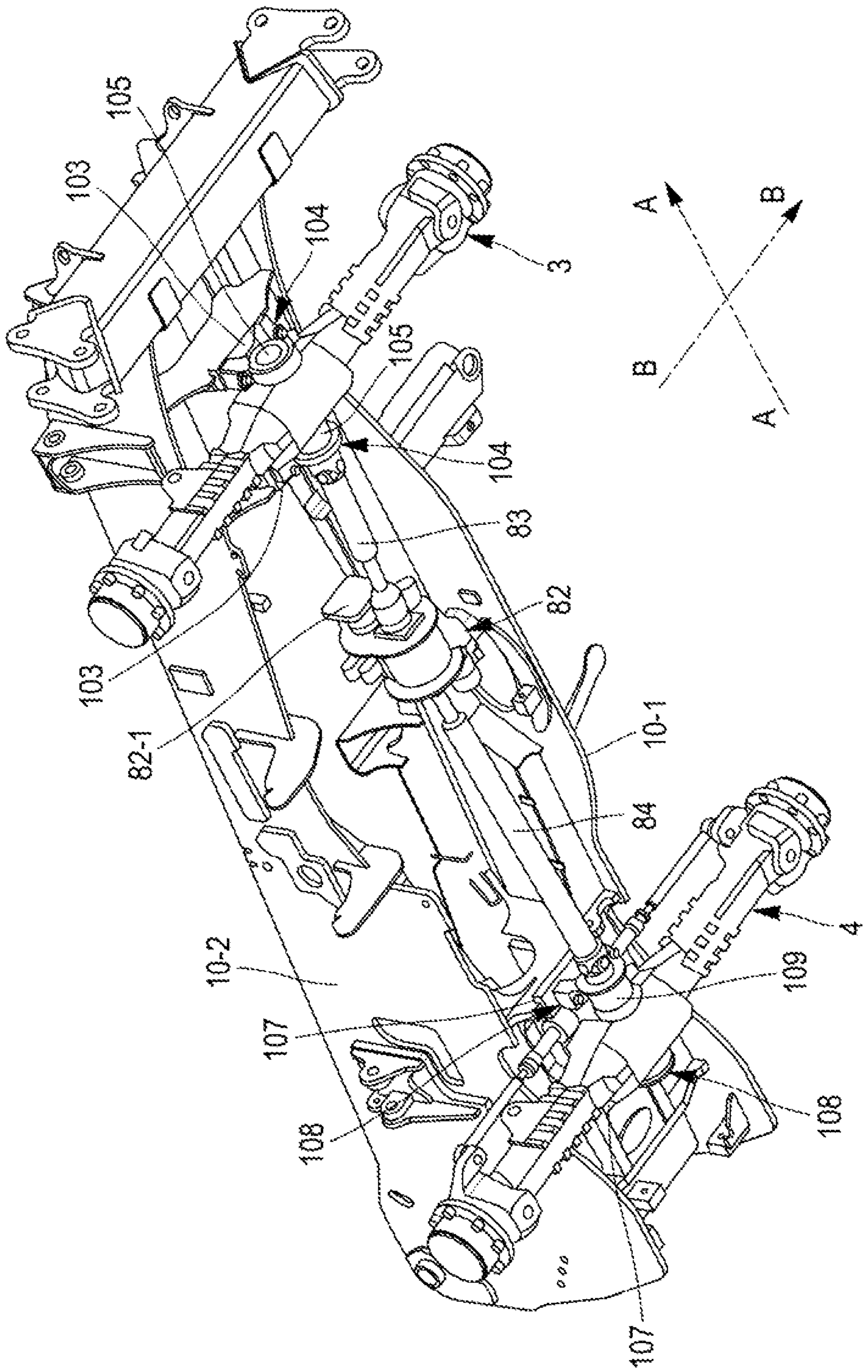
FIG. 3 is a partial perspective bottom view of the chassis and axles of the construction vehicle shown in FIG. 1.
Figure 8:
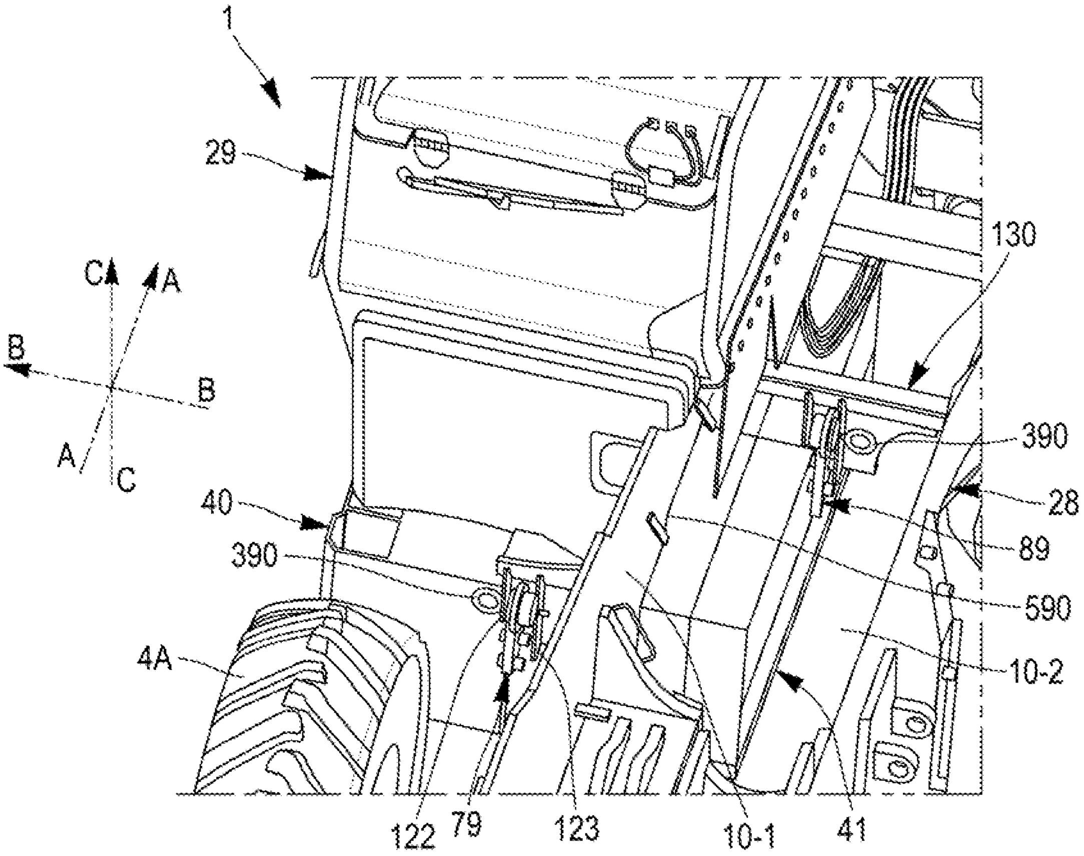
FIG. 8 is a partial perspective top view of the construction vehicle shown in FIG. 1, without the lifting arm.

The chassis 2 has two longitudinal members 10-1 and 10-2, which are shown most clearly in FIG. 2, FIG. 3 and FIG. 8. The longitudinal members 10-1, 10-2 are generally flat metal parts that are parallel to each other and extend parallel to the longitudinal direction A-A.

The chassis 2 can be moved over the surface of the ground (not shown in the drawings) by means of a front axle 3 carrying two wheels 3A, one on the left and the other on the right, and a rear axle 4 carrying two wheels 4A, one on the left and the other on the right. The front axle 3 and the rear axle 4 are spaced apart in the longitudinal direction A-A.

As shown in particular in FIG. 1 and FIG. 2, the lifting arm 20, like the longitudinal members 10-1, 10-2, extends parallel to the longitudinal direction A-A. The lifting arm 20 is articulated with the two longitudinal members 10-1, 10-2, between the two longitudinal members 10-1, 10-2, so as to be pivotable relative to the two longitudinal members 10-1, 10-2 about a pivot axis P-P (see FIG. 1 and FIG. 2). The pivot axis P-P extends in the transverse direction B-B.

The lifting arm 20 can be made in a number of different ways, in particular in the form of several telescopic sections (as shown), or alternatively in the form of an arm of fixed length. One end of the lifting arm 20 opposite the pivot axis P can carry a work tool or, as shown in FIG. 1, a modular tool holder capable of receiving different types of work tool, according to the known prior art. Work tool means for example forks, buckets, winches, grabs, and the like.

With reference to FIG. 2, the pivot axis P-P is located behind the rear axle 4 in the longitudinal direction A-A of the vehicle 1. Said pivot axis is also located above the front axle 3 and the rear axle 4 in the vertical direction C-C of the vehicle 1.

With reference to FIG. 3, the front axle 3 is fastened to the longitudinal members 10-1, 10-2 via two front support plates 103, each rigidly connected to the longitudinal member and to the longitudinal member 10-2.

A radial bearing 104 is fastened, in this case using bolts, to each of the front support plates 103. The front axle 3 has two trunnions 105. Each of the trunnions 105 is seated in a radial bearing 104. The front axle 3 is thus held in position relative to the chassis 2 in the longitudinal direction A-A, while still being able to pivot relative to the chassis 2.

Similarly, and again with reference to FIG. 3, the rear axle 4 is fastened to the longitudinal members 10-1, 10-2 via two rear support plates 107, each rigidly connected to the longitudinal member 10-1 and to the longitudinal member 10-2. A radial bearing 108 is fastened, in this case using bolts, to each of the rear support plates 107. The rear axle 4 has two trunnions 109. Each of the trunnions 109 is seated in a radial bearing 108. The rear axle 4 is thus held in position relative to the chassis 2 in the longitudinal direction A-A, while still being able to pivot relative to the chassis 2.

FIG. 1 and FIG. 8 also show that the vehicle 1 comprises a cab 29 in which an operator of the vehicle 1 can be seated, and a box 28 that can accommodate the different equipment of the vehicle 1. The cab 29 projects from the longitudinal member 10-1 in the opposite direction to the longitudinal member 10-2, and the box 28 projects from the longitudinal member 10-2 in the opposite direction to the longitudinal member 10-1. More specifically, the box 28 is arranged along the longitudinal member 10-2, outside this longitudinal member 10-2 in the transverse direction B-B. “Outside a longitudinal member in the transverse direction B-B” means that the box 28 is not located between the longitudinal members 10-1, 10-2, but rather outside the space between the longitudinal members 10-1, 10-2. The cab 29 could also be arranged along the longitudinal member outside this longitudinal member 10-1 in the transverse direction B-B. However, as shown in FIG. 8, the cab 29 preferably is also arranged above the space between the longitudinal members 10-1 and 10-2, thereby increasing the internal volume of the cab 29.

Although the drawings and the description below show the cab 29 projecting from the longitudinal member 10-1 on the left of the vehicle 1 and the box 28 projecting from the longitudinal member 10-2 on the right of the vehicle 1, it is understood that the reverse arrangement is also possible, i.e. the arrangement of the longitudinal members 10-1, 10-2 can be inverted.

As shown, the cab 29 and the box 28 are arranged between the front axle 3 and the rear axle 4 in the longitudinal direction A-A.

Again with reference to FIG. 1 and FIG. 8, a battery module 40 is located beneath the cab 29 in the vertical direction C-C. The battery module 40 is designed to supply electricity to at least one electric motor of the vehicle 1, as described below.

Figure 4A:
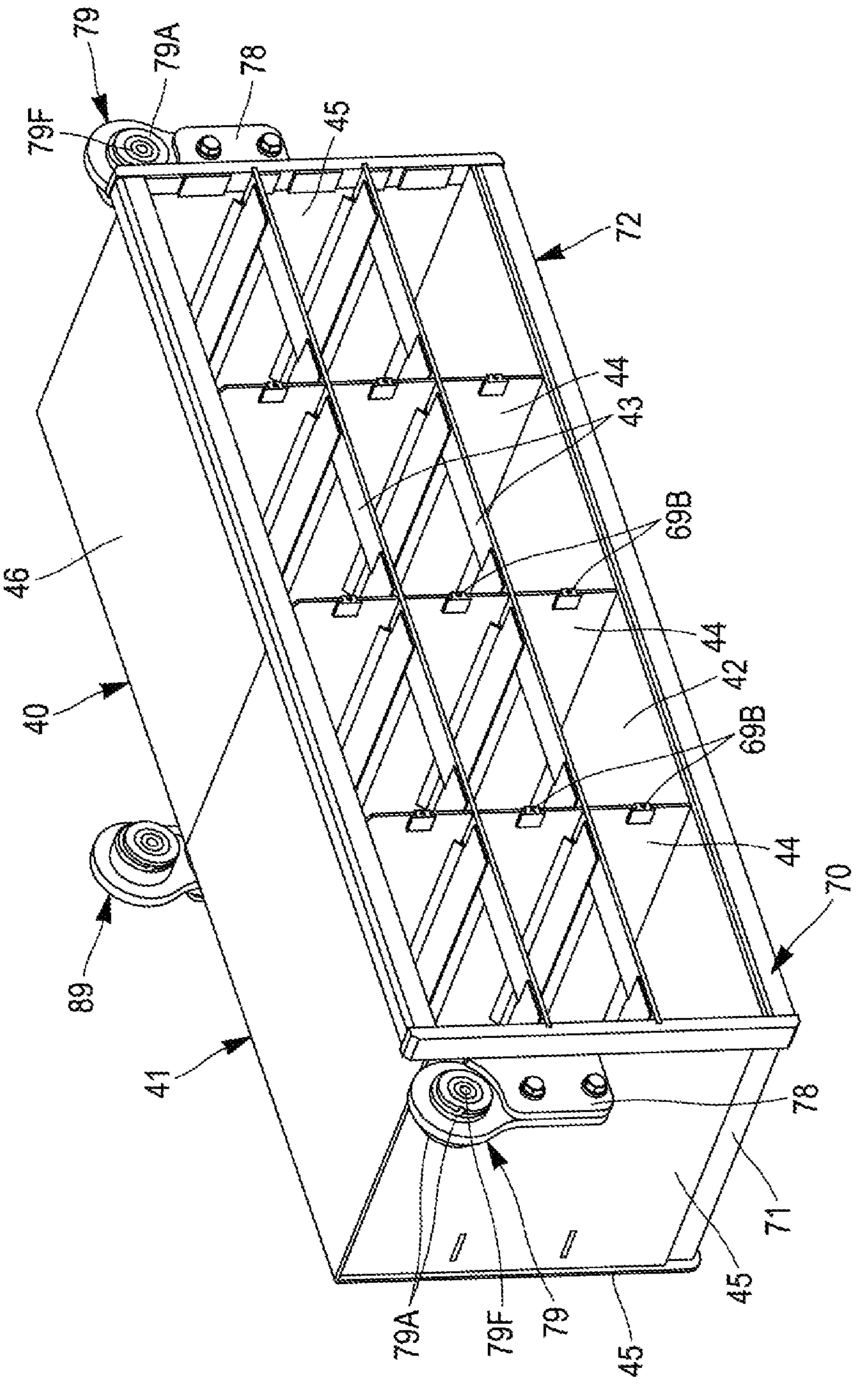
FIG. 4A is a perspective view of a receiving structure and a fastening structure for a battery module.

The battery module 40 is described below with reference to FIGS. 4A, 4B, 4C, 4D and 5. As shown, the battery module 40 is parallelepipedic overall and comprises a receiving structure 41. With reference to FIG. 4A, the receiving structure 41 comprises a base plate 42, a top plate 46 parallel to the base plate 42, and side plates 45 extending perpendicularly to the top plate 46 and the base plate 42, so that the base plate 42, the top plate 46 and the side plates 45 together define a receiving volume for the battery elements 60.

At least two battery elements 60 (see FIG. 4C) rest on an upper face (i.e. facing upwards in the vertical direction C-C) of the base plate 42. Furthermore, the receiving structure 41 may comprise one or more intermediate support elements 43 (see FIG. 4A and FIG. 4B) that are flat and parallel to the base plate 42, and other battery elements rest on this or these intermediate support elements 43.

Separator plates 44 (see FIG. 4A and FIG. 4B) can extend perpendicularly to the base plate 42 and to the intermediate support elements 43, so as to define sub-volumes, each of the sub-volumes being dimensioned to receive one battery element 60.

In a known manner, each battery element 60 comprises a parallelepiped housing containing the electrolytic cell or cells generating the voltage at the terminals of the battery element 60. The battery element 60 is for example a lithium-ion battery. In the example shown, one side of the housing carries a battery management system (BMS) that, in a known manner, monitors and manages the charging and discharging of all of the electrolytic cells in the battery element 60. This battery management system also carries the output terminals of the battery element 60. Alternatively, the battery management system can be shared between several battery elements 60 and/or built into the connection box 50 described below.

Figure 4B:
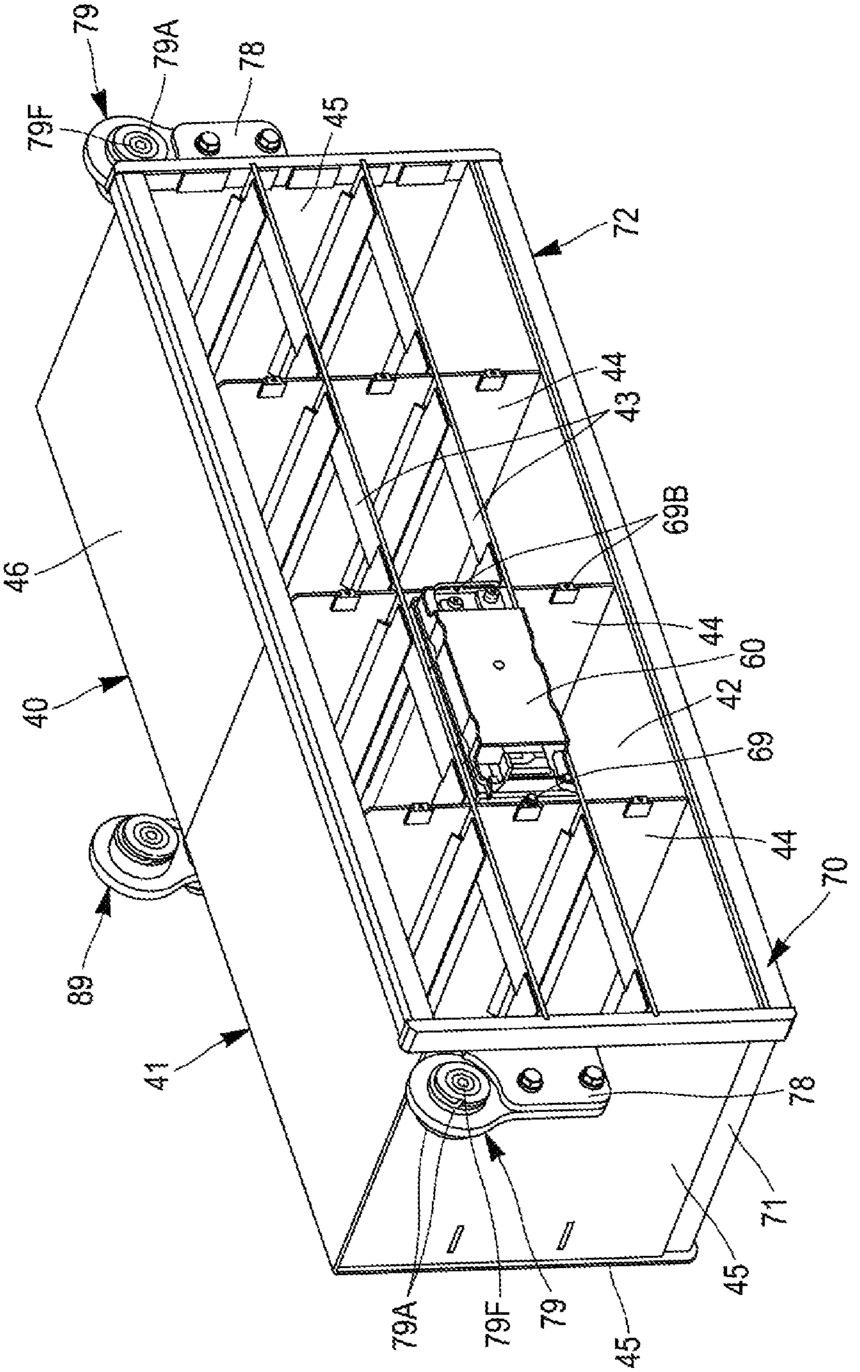
FIG. 4B is a perspective view of the receiving structure and the fastening structure in FIG. 4A, together with a battery element.
Figure 4C:
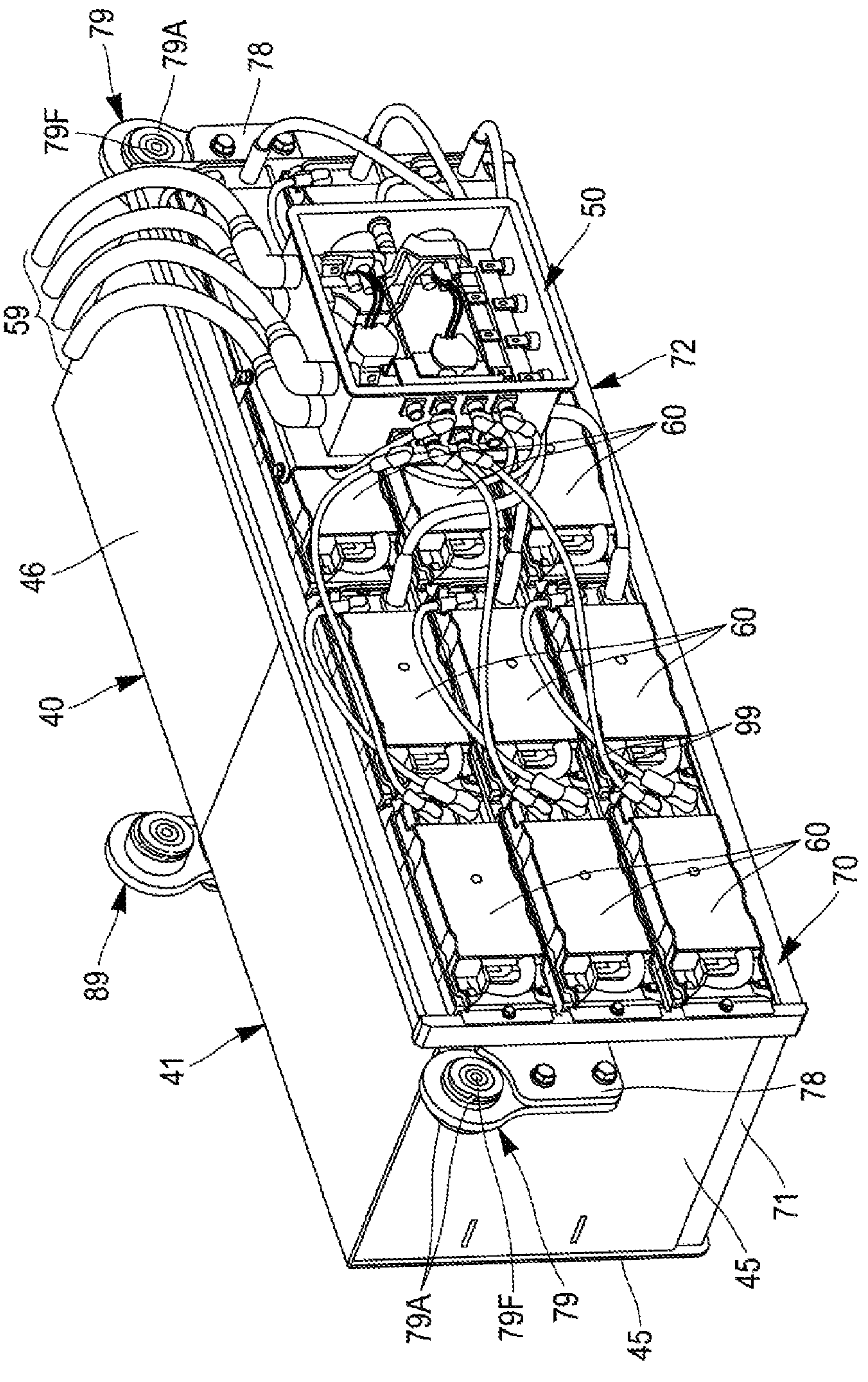
FIG. 4C is a view practically identical to FIG. 4B, with a plurality of battery elements installed to form a battery module.

With reference to FIG. 4B and FIG. 4C, a battery element 60 is seated in each sub-volume defined by the base plate 42, the intermediate support elements 43 and the separator plates 44. Each battery element 60 is held in place by removable fastening elements 69 (see FIG. 4B), such as screws, that are seated in the blind holes 69B in the separator plates 44 (see FIGS. 4A and 4B).

Preferably, the removable fastening elements 69 are electrically conductive and the separator plates 44 are electrically conductive, the separator plates 44 are electrically connected to each other and to the battery elements 60 to form a common electrical ground for the battery elements 60. This enables all of the battery elements 60 to be grounded in a very simple way, without additional wiring. For example, the removable fastening elements 69 and the separator plates 44 (and possibly other elements of the receiving structure 41) are made electrically conductive by a galvanizing process, in particular by electrogalvanizing. Electrogalvanizing is particularly beneficial because it also protects the separator plates 44 (and possibly other elements of the receiving structure 41) against corrosion.

The battery elements 60 are electrically connected to at least one electrical connection box 50.

Figure 5:
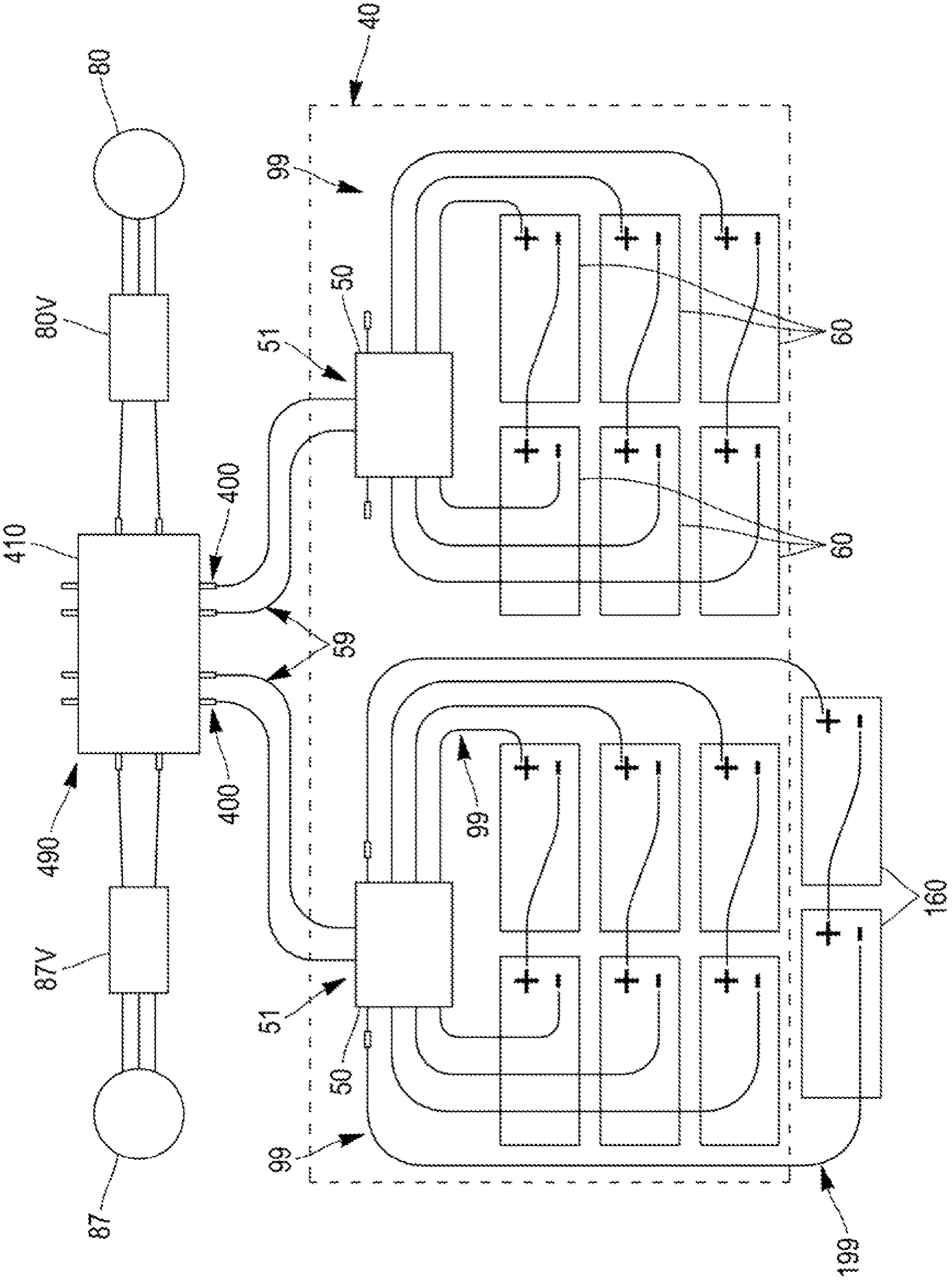
FIG. 5 is a block diagram showing the electrical power supply provided to the construction vehicle in FIGS. 1 to 3 using the battery module shown in FIGS. 4A to 4D.

In an embodiment shown in FIG. 5, the battery module 40 comprises twelve battery elements 60, and each battery element 60 delivers a voltage of 48 V. The battery elements 60 are connected in series in pairs to deliver a voltage of 96 V in each case. Three pairs of battery elements 60 are connected in parallel with each other to a first connection box 50 by means of electrical cables 99, and three further pairs of battery elements 60 are connected in parallel with each other to a second connection box 50 by means of electrical cables 99.

Each connection box 50 has a power output socket 51 for the electrical connection of the battery module 40 to a power input socket 400 (see FIG. 5) on the vehicle 1.

With reference to FIG. 5, the vehicle 1 includes a power distribution box 410 that carries the power input sockets 400 and may be designed to supply the electrical components of the vehicle 1. Such power distribution boxes are already known and are not described in detail here.

The power distribution box 410 is notably electrically connected to an electric variable speed drive 80V, which is in turn electrically connected to an electric motor 80 to propel the chassis 2, and to an electric variable speed drive 87V, which is in turn electrically connected to an electric motor 87 to drive the lifting arm 20. The variable speed drives 80V and 87V used here are three-phase inverter variable speed drives that receive a DC voltage at the input and supply a three-phase AC voltage at the output. However, other electrical configurations are also possible.

Although not shown in FIG. 5, the power distribution box 410 can also be electrically connected to other electrical equipment on the vehicle 1, notably a heating module for the cab 29, and/or an air-conditioning module for the cab 29, and/or one or more DC/DC converters for supplying power to other electrical equipment on the vehicle, such as a signal light, horn, etc.

The power distribution box 410 can for example be seated in the box 28. The electrical connection boxes 50 can be arranged beneath the cab 29, since said boxes are positioned on the battery module 40.

The number of battery elements 60 and connection boxes 50 shown in FIG. 5 is just one example. A greater or lesser number of battery elements 60 and/or connection boxes can be provided, depending on the desired charging capacity of the battery module 40.

Furthermore, as shown schematically in FIG. 5, in order to increase the battery life of the vehicle 1, the vehicle may have one or more (in this case, two) additional battery elements 160. The additional battery elements 160 are not located in the battery module but for example in a dedicated compartment in the chassis 2. The additional battery elements 160 are electrically connected to the power distribution box 410, in this case via one of the connection boxes 50 by means of additional electrical cables 199.

As mentioned above, the electric motor 80 is used to propel the chassis 2. With reference to FIG. 3, an output shaft (not shown) of the electric motor 80 (not shown in FIG. 3) drives two shafts 83 and 84 via a gearbox 82. The shaft 84 drives the rear axle 4 and therefore the wheels 4A, and the shaft 83 drives the front axle 3 and therefore the wheels 3A. The gearbox 82 can have one or more gear ratios. It should be noted that in this case the shafts 83 and 84 extend substantially parallel to the front-rear axis A-A of the vehicle 1, and therefore to the longitudinal members 10-1, 10-2. Reference sign 82-1 in FIG. 3 indicates a possible position for connecting the output shaft of the electric motor to the gearbox 82. However, many other types of power transmission to the front axle 3 and the rear axle 4 are possible. Notably, there may be one electric motor for the front axle 3 and another electric motor for the rear axle 4. Alternatively, the electric motor 80 can drive a hydraulic pump, which in turn drives a hydraulic motor for the front axle 3 and another hydraulic motor for the rear axle 4.

The electric motor 87 drives the lifting arm 20. In one example, the electric motor 87 drives a hydraulic pump, which powers hydraulic actuators, such as hydraulic cylinders, to drive the movements of the lifting arm 20. The movements include, for example, up-down movements performed by a lifting cylinder located under the lifting arm 20, extension-retraction movements performed by a telescoping cylinder located in the lifting arm 20, and movements of the tool holder. Such hydraulic driving of the lifting arm 20 is well known and is therefore not described in detail here.

With reference to FIGS. 4A and 4B, the battery module 40 also comprises a fastening structure indicated as a whole with reference sign 70.

The fastening structure 70 comprises two fastening portions 79 on both sides of the battery module 40. Each of the fastening portions 79 has a through-hole (not shown) receiving a hollow cylinder 79F.

The fastening structure 70 can also help to stiffen the receiving structure 41 and thereby stiffen the battery module 40. For example, in the embodiment shown, the fastening structure 70 comprises a bottom fastening plate 71 that supports the base plate 41, and a retaining frame 72 that is attached to the bottom fastening plate 71 and holds the side plates 45 and the top plate 46. For example, the retaining frame 72 may have counterbores or slots (not shown) in which the ends of the side plates 45 and top plate 46 are engaged.

In the embodiment shown, the fastening portions 79 are attached, for example by bolting, to flanges 78. The flanges 78 are rigidly connected to the retaining frame 72, for example by welding.

Figure 4D:
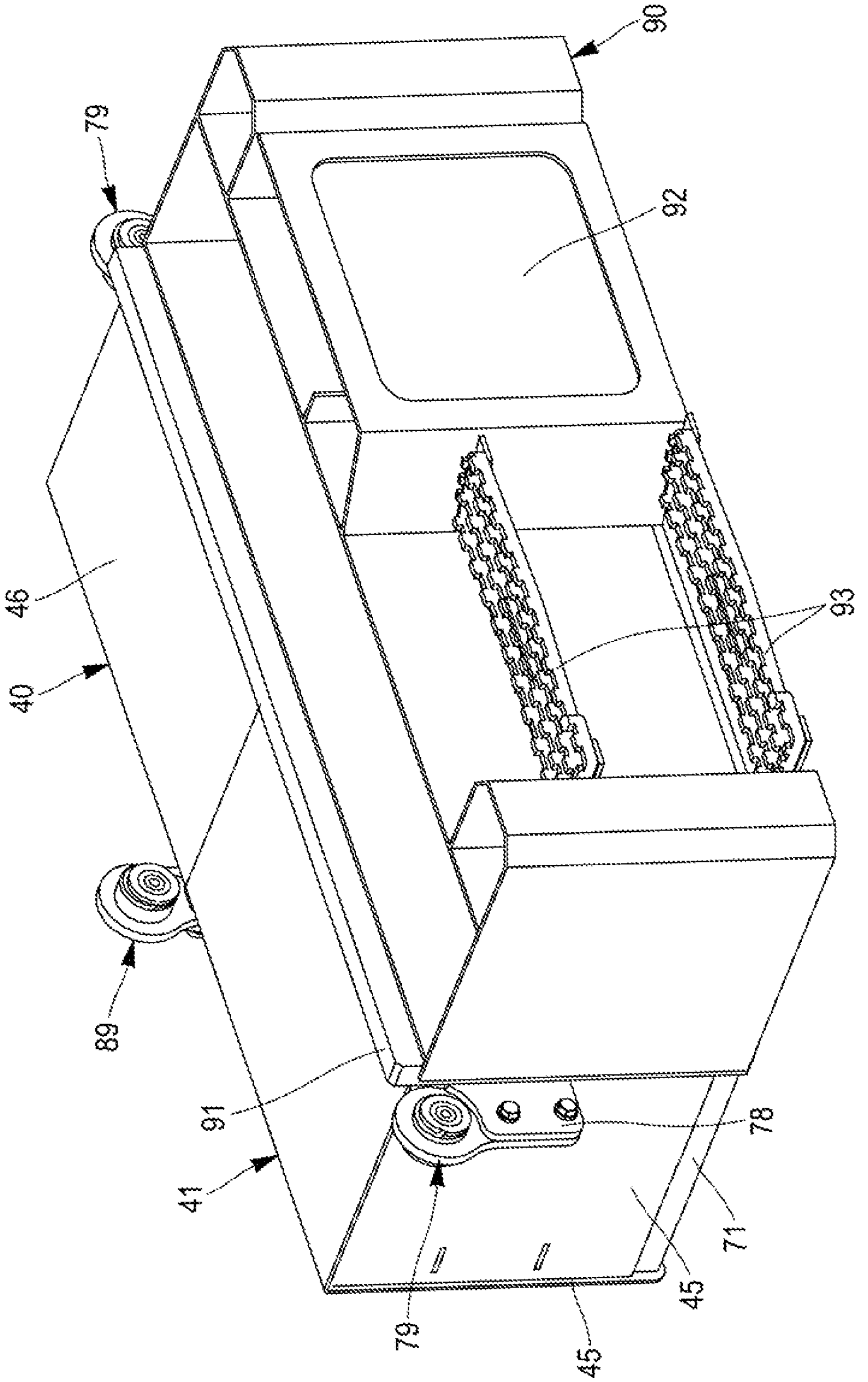
FIG. 4D is a perspective view of the battery module in FIG. 4C, together with a fairing.

FIG. 4D shows that the battery module 40 can also comprise a fairing 90. The fairing covers the battery elements 60 and thus protects the battery elements 60, in particular against accidental impact or unauthorized access. The fairing 90 faces outwards from the vehicle 1 in the fastening position of the battery module 40 shown in FIG. 1 and FIG. 8.

The fairing 90 is removably engaged with the fastening structure 70. This enables the battery elements 60 to be accessed by removing the fairing 90. In the example shown, the fairing 90 is engaged by interlocking between at least one slot 91 in the fairing 90 and the retaining frame 72.

With reference to FIG. 1 and FIG. 4D, the fairing 90 may have a hatch 92 providing access to at least one of the electrical connection boxes 50 when the fairing 90 is engaged with the fastening structure 70, and/or one or more steps 93 enabling the operator of the vehicle 1 to access the cab 29.

As shown schematically in FIG. 5, the power distribution box 410 can include a charging socket 490 for charging the battery elements 60. In this case, the hatch 92 also preferably provides access to a compartment dimensioned to contain a charging cable that can be electrically connected to this charging socket 490.

The fastening of the battery module 40 beneath the cab 29 in the vertical direction C-C is described below.

Figure 6:
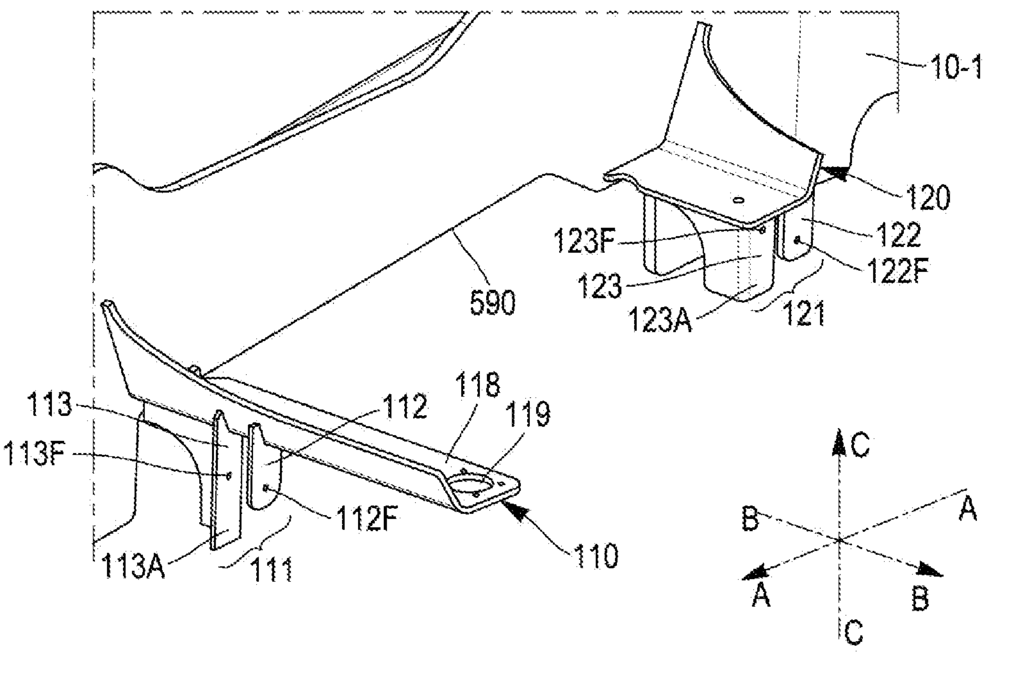
FIG. 6 is a partial perspective view of a longitudinal member of the chassis of the construction vehicle, with fastening arms projecting from said longitudinal member.

With reference to FIG. 6, two fastening arms 110 and 120 project from the longitudinal member 10-1. The fastening arms 110, 120 extend beneath the cab 29 (not shown in FIG. 6) in the transverse direction B-B. The fastening arms 110, 120 are spaced apart from one another in the longitudinal direction A-A.

The fastening arm 110 has a fork 111. The fork 111 comprises two flanges 112, 113. The flanges 112, 113 are parallel to each other and spaced apart from one another in the transverse direction B-B. The flanges 112, 113 have aligned through-holes 112F, 113F.

Similarly, the fastening arm 120 has a fork 121. The fork 121 comprises two flanges 122, 123. The flanges 122, 123 are parallel to each other and spaced apart from one another in the transverse direction B-B. The flanges 122, 123 have aligned through-holes 122F, 123F.

Figure 7A:
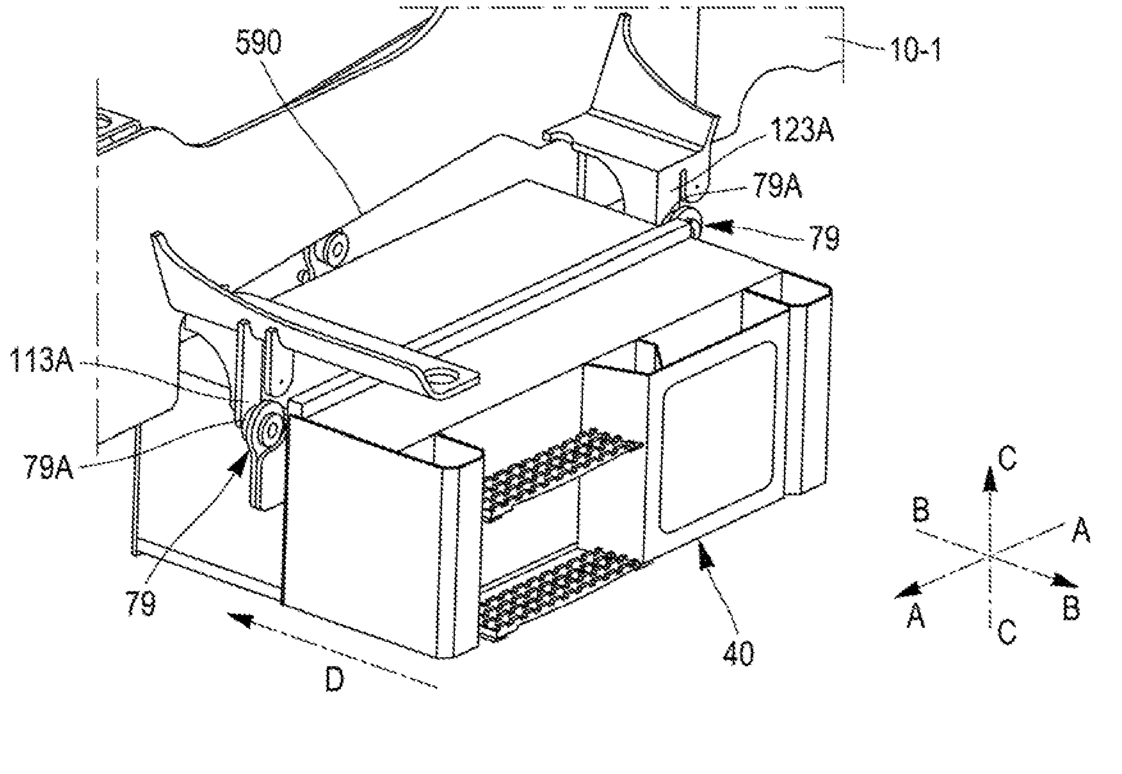
FIG. 7A is a view similar to FIG. 6, showing a first step for installing the battery module in FIGS. 4A to 4C using the fastening arms.

To secure the battery module 40 beneath the cab 29, the battery module 40 first undergoes a translational movement D parallel to the transverse direction B-B, to bring the battery module 40 into the position shown in FIG. 7A. In this position, the fastening portions 79 are in contact with sliding surfaces 113A, 123A (see FIG. 6 and FIG. 7A) of the flanges 113 and 123 respectively, which extend in the vertical direction C-C and the longitudinal direction A-A.

Figure 7B:
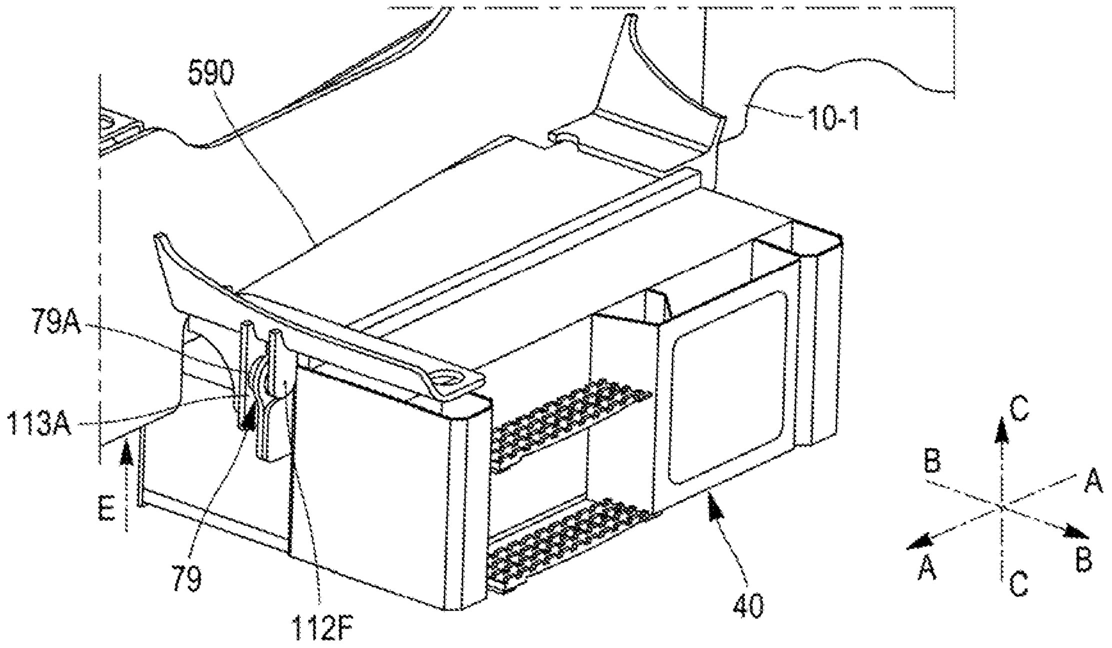
FIG. 7B is a view similar to FIG. 7A, showing a second step for installing the battery module in FIGS. 4A to 4C using the fastening arms.

The battery module 40 then undergoes a translational movement E parallel to the vertical direction C-C, to bring the battery module 40 into the position shown in FIG. 7B. This translational movement E is guided by the sliding of the fastening portions 79 and the sliding surfaces 113A, 123A. In the position shown in FIG. 7B, the fastening portions 79 are engaged in the forks 111, 121, and the hollow cylinders 79F are aligned with the through-holes 112F, 113F, 122F, 123F.

Two pins 390 (not shown in FIG. 7B but visible in FIG. 8) are then inserted, one into the through-holes 112F, 113F through one hollow cylinder 79F, and the other into the through-holes 122F, 123F through the other hollow cylinder 79F. The battery module 40 is then fastened to the longitudinal member 10-1 via the fastening structure 70 and the fastening arms 110, 120.

To facilitate the described sliding of the fastening portions 79 on the sliding surfaces 113A, 123A, the fastening portions 79 can be provided with elastic supports 79A, for example made of rubber or polymer, engaged on the cylinders 79F. These elastic supports 79A can also dampen any vibrations caused by operation of the vehicle 1, and protect the battery module 40 from these vibrations.

Clearly, the fastening of the battery module 40 described above is easily removable, since all that is required to remove the battery module 40 from beneath the cab 29 is to remove the pins 390 and carry out the steps described above in reverse order. This makes it easy to replace the battery module 40 when required, for example to replace a flat battery module 40 with a charged battery module 40.

The battery module 40 can be fastened to the fastening arms 110, 120 using means other than pins engaged in the forks 111, 121. For example, the battery module 40 could be fastened by screwing or bolting the fastening portions 79 to the forks 111, 121.

Advantageously, with reference to FIG. 8, the battery module 40 can be dimensioned so as to extend in part beneath a space between the longitudinal members 10-1, 10-2. This can increase the volume of the battery elements 60 and therefore the total charging capacity of the battery module 40. This can also improve the lateral balance of the vehicle 1, since the centre of mass of the battery module 40 is closer to the centre line of the vehicle 1. In this case, the longitudinal member 10-1 has a cut-out 590 (see FIGS. 6 to 8) to allow the battery module 40 to pass through. Furthermore, again with reference to FIG. 8, the chassis 2 advantageously comprises an additional fastening arm 130 and the battery module 40 advantageously comprises an additional fastening portion 89. The additional fastening arm 130 extends between the longitudinal members 10-1, 10-2. As shown in the figures, the additional fastening arm 130 is similar to the fastening arms 110, 120, and the additional fastening portion 89 is similar to the fastening portions 79. The cooperation therebetween is therefore similar to the described cooperation between the fastening portions 79 and the fastening arms 110, 120, and is therefore not described in detail again for the sake of conciseness.

In the embodiment shown, the fastening arm 110 supports the cab 29. For this purpose, with reference to FIG. 6, the fastening arm 110 has a bearing surface 118 for the cab 29. The fastening arm 110 can also have a through-hole 119 to receive an elastic support (not shown) arranged between the cab 29 and the fastening arm 110. In other variants that are not shown, both the fastening arm 110 and the fastening arm 120 can support the cab 29. In other variants that are not shown, the fastening arm 120 can support the cab 29, but not the fastening arm 110.

Two variants of the battery module are described below, said variants also enabling the battery module to be fastened beneath the cab 29 in the vertical direction C-C, but by means of a translational movement parallel to the transverse direction B-B and not by means of a translational movement parallel to the transverse direction B-B followed by a translational movement parallel to the vertical direction C-C. Elements identical to the elements already described above are indicated using the same reference signs and are not described again except where necessary.

Figure 9:
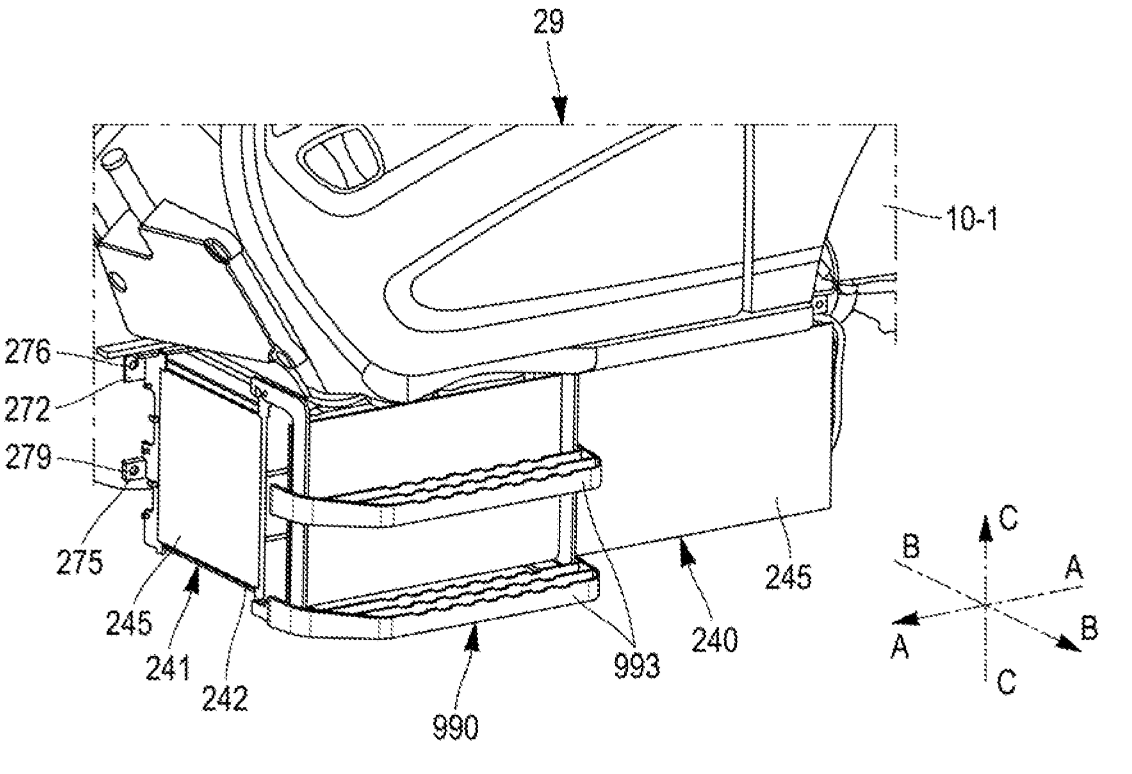
FIG. 9 is a partial perspective view showing a variant of the battery module that is intended to be fastened directly to a longitudinal member, in a fastening position that is located beneath the cab of the construction vehicle in a vertical direction of the construction vehicle.
Figure 10:
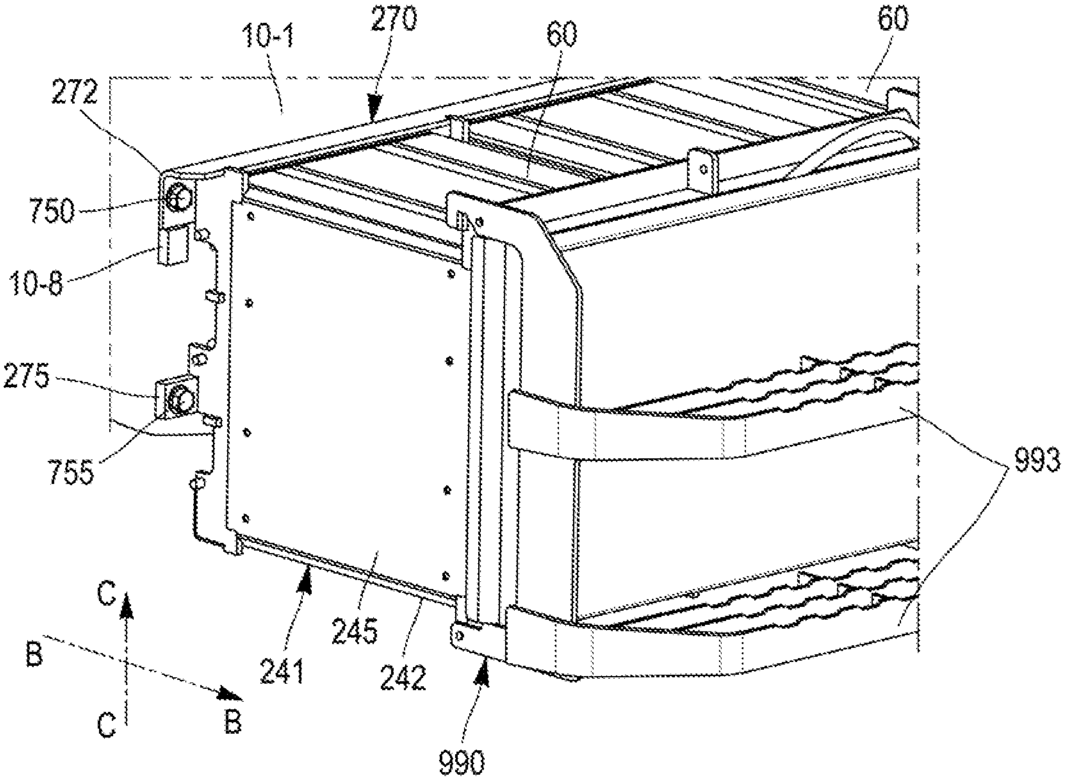
FIG. 10 is a magnified view of a portion of FIG. 9, showing more precisely how the battery module is fastened.

In the variant shown in FIG. 9 and FIG. 10, a battery module 240 is designed to be fastened directly to the longitudinal member 10-1, in a fastening position that is located beneath the cab 29 in the vertical direction C-C.

The battery module 240 is parallelepipedic overall and comprises a receiving structure 241 and a fastening structure 270. The receiving structure 241 is a parallelepipedic box that defines a receiving volume for battery elements 60. The receiving structure 241 thus comprises a base plate 242, and side plates 245 extending perpendicularly to the base plate 242.

At least two battery elements 60 rest on an upper face (i.e. facing upwards in the vertical direction C-C) of the base plate 242. Furthermore, the receiving structure 241 may comprise one or more intermediate support elements (not shown) that are flat and parallel to the base plate 242, and other battery elements 60 rest on this or these intermediate support elements.

The battery module 240 also includes the electrical connection box 50 and the power output socket 51 already described above. Although not shown, the electrical connection box 50 can be located in the receiving structure 241 or between the receiving structure 241 and the cab 29.

The fastening structure 270 comprises a profiled element 272. The profiled element 272 is rigidly connected to the receiving structure 241, preferably by spot welding. The profiled element 272 is in this case an angle iron with an L-shaped cross section, extending along the entire length of the receiving structure 241. Each of the two ends of the profiled element 272 has a through-hole 276 (see FIG. 9) dimensioned to receive a removable fastening element 750 (see FIG. 10) such as a bolt or a screw. The removable fastening element 750 enables the profiled element 272, and therefore the battery module 240, to be fastened directly to the longitudinal member 10-1 by means of corresponding blind holes (not shown) in the longitudinal member 10-1.

This enables the battery module 240 to be brought beneath the cab 29 into the position shown in FIG. 9 and FIG. 10, by a simple translational movement parallel to the transverse direction B-B.

The longitudinal member 10-1 can have a stop 10-8 beneath the removable fastening elements 750 in the vertical direction C-C. The profiled element 272 rests on the stop 10-8 when said profiled element is fastened to the longitudinal member 10-1 by the removable fastening elements 750, which can reduce the risk of shearing of the removable fastening elements 750.

The fastening structure 270 can also include an additional fastening bar 275 parallel to the profiled element 272. The additional fastening bar 275 extends along the entire length of the receiving structure 241 and has a through-hole 279 (see FIG. 9) at each of the two ends thereof that is dimensioned to receive an additional removable fastening element 755 (see FIG. 10) such as a bolt or a screw. The battery module 240 is thus fastened to the longitudinal member 10-1 at two points at each of the two ends thereof in the longitudinal direction A-A, further fastening the battery module 240 to the longitudinal member 10-1.

In the variant shown in FIG. 11A, FIG. 11B and FIG. 110, a battery module 340 is designed to be fastened indirectly to the longitudinal member 10-1, in a fastening position that is located beneath the cab 29 in the vertical direction C-C. Elements identical to the elements already described above are indicated using the same reference signs and are not described again except where necessary.

The battery module 340 is identical to the battery module 240, except that the battery module 340 is fastened by screwing or bolting to the two side plates 245 facing the receiving structure 241, rather than by a separate fastening structure for the side plates 245. More specifically, two retaining plates 600 project from the longitudinal member 10-1. The retaining plates 600 are located beneath the cab 29 in the vertical direction C-C and extend in the vertical direction C-C and the transverse direction B-B. The retaining plates 600 are spaced apart from one another in the longitudinal direction A-A. Each of the two side plates 245 has blind-holes or through-holes for receiving removable fastening elements 850 (see FIG. 11B and FIG. 110) such as bolts or screws. Each of the two side plates 245 is thus removably fastened to the opposing retaining plate 600 by means of the removable fastening elements 850.

This enables the battery module 340 to be brought beneath the cab 29 into the position shown in FIG. 11B and FIG. 110, by a simple translational movement parallel to the transverse direction B-B.

Advantageously, the battery module 340 has two guide elements 390, only one of which is shown in FIGS. 11A, 11B and 11C. The guide elements 390 are rigidly connected to the receiving structure 241. Each of the two guide elements 390 cooperates with an upper end of the retaining plate 600 to guide the battery module 340 into the position shown in FIG. 11B. In this case, the guide elements 390 are tabs. In variants that are not shown, the guide elements 390 can have a different shape, for example a rail with an L-shaped or C-shaped cross section.

In the variant shown in FIGS. 9 and 10, as in the variant shown in FIGS. 11A and 11B, the battery module 240 or 340 may also comprise a removable fairing 990, which has a hatch 992 providing access to at least one of the electrical connection boxes 50 and/or a storage compartment for a charging cable, and/or one or more steps 993 enabling the operator of the vehicle 1 to access the cab 29.

Making the battery module 40, 240, 340 from a plurality of battery elements 60 as shown simplifies maintenance of the battery module 40, 240, 340, notably as an individual battery element 60 can be replaced in the event of failure or damage. Alternatively, the battery module 40, 240, 340 can be designed as a one-piece battery module with a single power output socket 51 electrically connectable to the power distribution box 410. Such a battery module is fastened beneath the cab 29 in the vertical direction C-C in the same manner as described above.

Although the invention has been described in relation to several specific embodiments, it is evidently in no way limited thereto and it includes all of the technical equivalents of the means described and the combinations thereof where these fall within the scope of the invention.

Use of the verb "comprise" or "include", including when conjugated, does not exclude the presence of other elements or other steps in addition to those mentioned in a claim.

In the claims, reference signs between parentheses should not be understood to constitute a limitation to the claim.

The invention claimed is:

1. A construction vehicle comprising:

a chassis including

- a first longitudinal member and a second longitudinal member, the first longitudinal member and the second longitudinal member being parallel to each other and extending parallel to a longitudinal direction of the construction vehicle, and a front axle and a rear axle spaced apart in the longitudinal direction of the construction vehicle;

a lifting arm extending parallel to the longitudinal direction of the construction vehicle, the lifting arm being articulated with the longitudinal members between the two longitudinal members so as to be pivotable relative to the longitudinal members about a pivot axis extending in a transverse direction of the construction vehicle that is perpendicular to the longitudinal direction of the construction vehicle;

at least one electric motor for one or more of propelling the chassis and driving the lifting arm;

a cab for an operator of the construction vehicle, the cab projecting from the first longitudinal member in the transverse direction of the construction vehicle in a direction away from the second longitudinal member, the cab being arranged in a static manner between the front axle and the rear axle in the longitudinal direction of the construction vehicle; and a battery module for supplying electricity to the at least one electric motor, the battery module including a fastening structure designed to be removably fastened to the first longitudinal member, in a fastening position located beneath the cab in a vertical direction of the construction vehicle that is perpendicular to the longitudinal direction and to the transverse direction of the construction vehicle, wherein the battery module in the fastening position is accessible from an outer side of the construction vehicle so that the battery module can be brought into or out of the fastening position from the outer side of the construction vehicle, the outer side of the construction vehicle being oriented in the transverse direction of the construction vehicle.

2. The construction vehicle of claim 1, wherein the fastening structure includes a profiled element that is removably fastened at both ends thereof directly to the first longitudinal member.

3. The construction vehicle of claim 2, wherein the first longitudinal member includes at least one stop that is located beneath the profiled element in the vertical direction of the construction vehicle and on which the profiled element rests when fastened to the first longitudinal member.

4. The construction vehicle of claim 1, further comprising two retaining plates projecting from the first longitudinal member, the two retaining plates being located beneath the cab and extending in the vertical direction and the transverse direction the construction vehicle and being spaced apart from one another in the longitudinal direction of the construction vehicle, wherein the fastening structure includes two fastening plates, each of the two fastening plates being removably fastened to one of the retaining plates.

5. The construction vehicle of claim 4, wherein the battery module further includes two guide elements, each guide element being intended to cooperate with an upper end of one of the retaining plates so as to guide the battery module towards the fastening position in a translational movement parallel to the transverse direction of the construction vehicle.

6. The construction vehicle of claim 1, wherein the construction vehicle further includes two fastening arms projecting from the first longitudinal member, the two fastening arms extending beneath the cab in the transverse direction of the construction vehicle and being spaced apart from one another in the longitudinal direction of the construction vehicle, the fastening structure includes two fastening portions, and each of the two fastening arms has a fork, each of the fastening portions being removably fastened to one of the forks.

7. The construction vehicle of claim 6, wherein at least one of the forks has a sliding surface extending in the vertical direction and the longitudinal direction of the construction vehicle, and at least one of the fastening portions is designed to slide on the sliding surface in a translational movement parallel to the vertical direction into the fastening position.

8. The construction vehicle of claim 7, wherein at least one of the fastening portions includes a sliding element made of one or more of polymer and rubber for sliding on the sliding surface.

9. The construction vehicle of claim 6, wherein the battery module extends in part beneath a space between the longitudinal members.

10. The construction vehicle of claim 6, wherein at least one of the two fastening arms supports the cab.

11. The construction vehicle of claim 1, wherein a power distribution box is electrically connected to the at least one electric motor, and the battery module includes a single power output socket electrically connectable to the power distribution box.

12. The construction vehicle of claim 11, wherein the battery module includes a base plate, the fastening structure being rigidly connected to or supporting the base plate, at least two battery elements resting on an upper face of the base plate, in the vertical direction, and at least one electrical connection box electrically connected to the battery elements, the electrical connection box including a power output socket electrically connectable to the power distribution box.

13. The construction vehicle of claim 12, wherein the battery module has separator plates separating the battery elements and to which the battery elements are fastened via removable fastening elements, and the removable fastening elements and the separator are electrically conductive, the separator plates being electrically connected to each other and to the battery elements to form a common electrical ground for the battery elements.

14. The construction vehicle of claim 11, wherein the power distribution box includes a charging socket for charging the battery module.

15. The construction vehicle of claim 1, wherein the battery module further includes a fairing, the fairing facing away from the construction vehicle in the transverse direction in the fastening position of the battery module, and the fairing has one or more steps enabling the operator of the construction vehicle to access the cab.

16. The construction vehicle of claim 14, further comprising a charging cable, the charging cable being electrically connectable to the charging socket, and wherein a fairing has a hatch allowing access to a compartment dimensioned to contain the charging cable.

* * * * *